United States Patent
Kobayashi et al.

[11] Patent Number: 5,864,072
[45] Date of Patent: Jan. 26, 1999

[54] HYDROGEN STORAGE ALLOY AND METHOD FOR PRODUCING THE SAME

[75] Inventors: Yukio Kobayashi; Akihiko Yoshida, both of Takefu, Japan

[73] Assignee: Shin-Etsu Chemical Co., Ltd., Tokyo, Japan

[21] Appl. No.: 4,298

[22] Filed: Jan. 8, 1998

[30] Foreign Application Priority Data

Jan. 9, 1997 [JP] Japan .................................. 9-013334

[51] Int. Cl.$^6$ .................................. B22F 1/00; B22F 3/00
[52] U.S. Cl. ........................ 75/246; 148/513; 420/416; 420/900; 75/343; 75/352
[58] Field of Search .................................. 148/513, 514; 75/246, 343, 352; 420/416, 900

[56] References Cited

U.S. PATENT DOCUMENTS

| | | | |
|---|---|---|---|
| 4,661,415 | 4/1987 | Ebato et al. | 428/570 |
| 4,893,756 | 1/1990 | Fetcenko et al. | 241/65 |
| 4,946,646 | 8/1990 | Gamo et al. | 420/415 |
| 5,205,985 | 4/1993 | Seri et al. | 420/422 |
| 5,460,745 | 10/1995 | Lee | 252/182.32 |
| 5,468,309 | 11/1995 | Seri et al. | 148/421 |
| 5,512,385 | 4/1996 | Komori et al. | 429/101 |
| 5,575,831 | 11/1996 | Yamamurg et al. | 75/614 |
| 5,591,394 | 1/1997 | Lee et al. | 420/422 |
| 5,605,585 | 2/1997 | Yamamoto et al. | 148/513 |
| 5,680,896 | 10/1997 | Yamamoto et al. | 164/479 |

FOREIGN PATENT DOCUMENTS

| | | |
|---|---|---|
| 51-13934 | 2/1976 | Japan . |
| 53-4918 | 1/1978 | Japan . |
| 54-64014 | 5/1979 | Japan . |
| 60-250558 | 12/1985 | Japan . |
| 61-91862 | 5/1986 | Japan . |
| 61-233969 | 10/1986 | Japan . |

*Primary Examiner*—Ngoclan Mai
*Attorney, Agent, or Firm*—McDermott, Will & Emery

[57] ABSTRACT

A method for making a hydrogen storage alloy comprises subjecting a bulky hydrogen storage alloy to a first thermal treatment at a temperature ranging from 800° to 1100° C., cooling the thus treated alloy, grinding the cooled alloy to pieces having an average particle size of 20 μm or below, and subjecting the pieces to a second thermal treatment in vacuum or in an atmosphere of an inert gas at a temperature of 200° to 1050° C. to obtain an alloy product. A hydrogen storage alloy obtained by the method is also described.

12 Claims, No Drawings

HYDROGEN STORAGE ALLOY AND METHOD FOR PRODUCING THE SAME

BACKGROUND OF THE INVENTION

1. Field of the Invention

This invention relates to a hydrogen storage alloy which is adapted for use as a negative electrode of alkaline batteries. More particularly, the invention relates to a hydrogen storage alloy which exhibits a small gradient in a plateau region of a PCT (pressure composition isotherm) characteristic curve, and a method for producing such an alloy. The invention also relates to a sintered product of the alloy obtained by the method.

2. Description of the Prior Art

After the discovery of hydrogen storage alloys capable of storing and releasing hydrogen, extensive studies on the application of the alloys have been made. In fact, alkaline batteries, which make use of hydrogen storage alloys as a negative electrode, have been already put into practice. Improved hydrogen storage alloys have been successively developed for use in the batteries.

LaNi$_5$ alloy, which was initially developed (see Japanese Laid-open Patent Application No. 51-13934) is advantageous in its great storage of hydrogen. However, La is inconveniently expensive, coupled with another problem that the alloy is liable to be broken into fine pieces when repeating storage and release of hydrogen and is prone to be corroded on contact with alkaline or acid solutions. In fact, when using the hydrogen storage alloy as a negative electrode of alkaline batteries, the battery exhibits a high initial capacity, but the capacity is reduced to a half of the initial capacity when about 50 charge and discharge cycles are repeated, thus presenting the problem that the electrode cannot stand use over a long time.

In order to overcome the problem, there has been proposed the use of Misch metal (hereinafter referred to simply as Mm) wherein part of La is replaced by Ce, Pr, Nd or other rare earth metals, or a LaNi$_5$ hydrogen storage alloy wherein part of Ni is placed by a metal such as Co, Al, Mn or the like. These proposals are set out, for example, in Japanese Laid-open Patent Application Nos. 53-4918, 54-64014, 60-250558, 61-91862 and 61-233969.

Another method has been proposed in order to overcome the above-stated problem. In the method, there is used a hydrogen storage alloy which has been broken into fine pieces to an extent that they suffer further breakage into finer pieces. Such fine alloy particles undesirably exhibit a great gradient in the plateau region of the PCT characteristic curve of the hydrogen storage alloy. In the worst case, the plateau region may disappear, making it difficult to use the alloy in practical applications.

SUMMARY OF THE INVENTION

We have made intensive studies on hydrogen storage alloys in order to solve the above problems. As a result, it has been found that when a hydrogen storage alloy, which has been broken into pieces having an average particle size of 20 μm or below, is subjected to thermal treatment in vacuum or in an atmosphere of an inert gas at a temperature within a certain range, there can be obtained a hydrogen storage alloy powder or a sintered product thereof whose gradient in the plateau region of its POT characteristic curve is small.

It is accordingly an object of the invention to provide a powder or particles of a hydrogen storage alloy which are very unlikely to suffer further breakage into finer particles and exhibits a small gradient in the plateau region of a PCT characteristic curve.

It is another object of the invention to provide a method for making such a powder or particles as mentioned above and also a sintered product obtained after the thermal treatment.

The above objects can be achieved, according to one embodiment of the invention, by a method for making a hydrogen storage alloy which comprises subjecting a bulky hydrogen storage alloy to a first thermal treatment at a temperature ranging from 800° to 1100° C., cooling the thus treated alloy, grinding the cooled alloy to pieces having an average particle size of 20 μm or below, and subjecting the pieces to a second thermal treatment in vacuum or in an atmosphere of an inert gas at a temperature of 200° to 1050° C. to obtain an alloy product. The second thermal treatment is preferably continued over a time of 0.1 to 10 hours.

In the method, the alloy pieces prior to the second thermal treatment should preferably have an oxygen content of not greater than 0.8 wt %.

According to another embodiment of the invention, there is also provided a hydrogen storage alloy obtained by the above method, wherein when the alloy is subjected to measurement of a PCT characteristic, the gradient, pf, in a plateau region of a PCT characteristic curve is in the range of 0.5 or below wherein pf=ln(PH/M=0.5/PH/M=0.2) in which PH/M=0.5 is an equilibrium pressure of hydrogen (MPa) at H/M=0.5 and PH/M=0.2 is an equilibrium pressure of hydrogen (MPa) at H/M=0.2. It should be noted that the term "H/M" means an adsorption of hydrogen, that is, the number of hydrogen atoms adsorbed per mole of the alloy, e.g. with LaNi5, six hydrogen atoms are adsorbed per mole of the alloy.

The hydrogen storage alloy obtained after the second thermal treatment in the above method should preferably consist of a sintered alloy product.

DETAILED DESCRIPTION OF THE INVENTION

The composition of a starting bulky hydrogen storage alloy used in the present invention and the manner of preparing the same are not critical. It is preferred to use an intermetallic compound of the type whose stoichiometric 10 ratio is represented by LaNi$_5$ wherein part of La is replaced by Ce, Pr, Nd or other rare earth element and/or part of Ni is replaced by Al, Co, Mn or the like.

More preferably, part of Ni should be replaced by Mn and also by Al from the standpoint of a prolonged life. Further, Ni should more preferably be partly replaced by Co in addition to Mn and Al.

Accordingly, MmNi$_5$-based hydrogen storage alloys are preferred, in which Mm is a Misch metal consisting of a mixture of rare earth elements such as La, Ce, Pr and Nd. Of these, the hydrogen storage alloy of the invention should more preferably be one represented by the general formula, Ln(Ni$_a$Mn$_b$Al$_c$Co$_d$)x, in which Ln represents La or a mixture of rare earth elements including at least La, and a, b, c, d and x are, respectively, an atomic ratio and $3.0 \leq a \leq 4.5$, $0 \leq b \leq 0.6$, $0 \leq c \leq 0.4$, $0 \leq d \leq 1.0$ and $4.0 \leq x \leq 6.0$. The rare earth elements other than La include Ce, Pd, Nd and the like. In the practice of the invention, the content of La in Ln should preferably be not less than 20 wt %, more preferably not less than 50 wt %.

Although the alloy should preferably have a composition represented by the above-defined general formula, elements other than those contained in the composition, e.g. Zr, Cu, Ti and the like, may be further added to the composition.

The method of making a bulky hydrogen storage alloy is not critical. In view of the fact that production costs are low, it is preferred to prepare an alloy ingot by casing a melt of individual components of an alloy composition in a mold.

The hydrogen storage alloy ingot made, for example, by the casting method is ground to pieces by means of a ball mill, a jet mill or the like to provide particles having an average size of 20 $\mu$m or below. It is known that where a milled alloy powder is used to make a nickel-hydrogen battery, the performance of the battery becomes worse than that of a battery using a hydrogen storage alloy made according to other methods such as a quenching method. In this connection, where the alloy powder ground according to the invention is thermally treated, the resultant alloy powder or a sintered product thereof can solve such a problem as mentioned above and has a great capability of hydrogen storage.

In the practice of the invention, importance should be placed on the average particle size irrespective of the manner of grinding.

Accordingly, the alloy powder used prior to the second thermal treatment in the present invention should have an average particle size of 20 $\mu$m or below. The use of the alloy powder having such a small particle size enables one to suppress further breakage of the alloy powder as would otherwise be caused when hydrogen is repeatedly stored in and released from the alloy. Where it is intended to obtain a sintered product of hydrogen storage alloy particles, a smaller average size is effective because the sintered product can be obtained at lower temperatures.

Now, the method of the invention is particularly described.

In the practice of the invention, the hydrogen storage alloy undergoes two-stage thermal treatments including a first thermal treatment of a bulky alloy and a second thermal treatment of a powder of a ground alloy.

As having set out before, the bulky hydrogen storage alloy may be cast under conditions defined before and cooled down to room temperature, and undergoes a first thermal treatment in a conventional manner at a temperature of 800° to 1100° C. for 5 to 20 hours. The manner of this thermal treatment may be selected from any known thermal treating methods. In general, the alloy is thermally treated in an electric furnace.

Subsequently, the thermally treated bulky alloy is cooled down to 100° C. or below and ground into particles having an average size of 20 $\mu$m or below. Preferably, the bulky alloy is subjected to wet grinding in an atmosphere of an inert gas such as Ar, Ne, He or the like or in vacuum.

Next, the particles are further subjected to a second thermal treatment in an atmosphere of an inert gas such as Ar, He, Ne or the like at a temperature of 200° to 1050° C., preferably from 600° to 1000° C., for a time of 0.1 to 10 hours, preferably from 1 to 10 hours. The second thermal treatment is carried out such as in an electric furnace as in the first thermal treatment.

If the temperature in the second thermal treatment is lower than 200° C., the PCT characteristic cannot be improved satisfactorily. Over 1050° C., the resultant alloy suffers excessive melting on the surfaces thereof, not permitting the alloy texture to have uniformity.

When the alloy powder is thermally treated at a temperature of 600° to 1000° C., the PCT characteristic can be remarkably improved.

During the second thermal treatment, the particles are sintered to provide an integrally combined sintered body when the thermal treating temperature is higher than 800° C. although depending on the treating time. When the sintered body is ground in pieces, particles with a desired size can be obtained. It will be noted that the term "sintered" used herein means mutual combination of alloy particles with its porosity being preferably 30% or over.

When the powder has an average size of 10 $\mu$m or below and thermal treating temperature is in the range of 200° to 500° C., it is left in powder form. Moreover, at a temperature ranging from 500° C. to 800° C., the alloy powder is converted to a semi-sintered state although these states may change depending on the treating time.

It has been found that when the sintered body or the particles obtained therefrom are subjected to measurement of a PCT characteristic by use of Sivert's device, a distinct plateau region wherein an amount of stored hydrogen is great is observed as having never expected in prior art alloy powders.

The term "distinct plateau region" is intended to mean that a gradient, pf, of the plateau region is 0.5 or below wherein pf=ln(PH/M=0.5/PH/M=0.2) in which PH/M=0.5 is an equilibrium pressure of hydrogen (MPa) at H/M=0.5, and PH/M=0.2 is an equilibrium pressure of hydrogen (MPa) at H/M=0.2. The value of pf indicates a hydrogen storage capacity of an alloy powder. A higher value of pf leads to better alloy characteristics.

In the practice of the invention, the value of pf is defined in the range of 0.5 or below, by which an amount of stored hydrogen increases at a given pressure of hydrogen. When the alloy is used in batteries, the battery can exhibit a high capacity and a prolonged life. Preferably, the value of pf is 0.45 or below.

When the alloy powder is subjected to the second thermal treatment under conditions set out before, an amount of hydrogen to be stored increases. More particularly, when an equilibrium pressure of hydrogen is 0.3 MPa at 45° C., an amount of stored hydrogen, H/M, can be as high as 0.6 or above. The use of the alloy as a negative electrode of a battery results in good electric characteristics such as a high capacity.

In order to improve the PCT characteristic, it is important that the alloy be subjected to two-stage thermal treatments, particularly, the second thermal treatment of an alloy powder having a defined average size, and that the oxygen concentration in the alloy be maintained at a certain level or below. In the practice of the invention, the oxygen concentration contained in the hydrogen storage alloy powder prior to the second thermal treatment or sintering is 0.8 wt % or below, preferably 0.5 wt % or below. If oxygen is contained in the alloy powder in greater amounts, a great amount of oxygen is left after completion of the thermal treatment, so that the alloy powder is undesirably oxidized. In this sense, the starting alloy should preferably have an oxygen concentration as small as possible. Nevertheless, the amount of oxygen in the alloy interrelates with the particle size of the alloy. As the average particle size decreases, the surface area of the alloy particles increases, resulting in an increasing amount of oxygen. In the present invention, the amount of oxygen in the atmosphere during the course of and after breakage of the alloy into fine pieces is strictly controlled so that the alloy powder has a content of oxygen of 0.8 wt % or below. The alloy is subjected to the second thermal treatment.

The second thermal treatment of the alloy powder is carried out within a temperature range defined above in vacuum or in an atmosphere of an inert gas, such as Ar, He, Ne or the like, wherein the oxygen concentration should be 900 ppm or below, preferably 500 ppm or below, and more preferably 200 ppm or below. When the oxygen concentration exceeds 900 ppm, the alloy particles are appreciably oxidized, thus undergoing corrosion to a substantial extent.

The second thermal treatment in such an atmosphere as mentioned above enables one to obtain a sintered product or powder of the alloy having an oxygen concentration of 1 wt % or below. When the oxygen concentration exceeds 1 wt %, the plateau region becomes narrow, meaning that the amount of stored hydrogen is unfavorably reduced.

Once again, when the alloy powder is thermally treated under such conditions as set out above at a temperature preferably from 500° to 1050° C., more preferably from 600° to 1000° C., the alloy particles are mutually combined together and thus sintered to obtain a sintered product of the alloy.

When the starting alloy powder or particles have an average size of 20 $\mu$m or below, preferably 1 to 10 $\mu$m, sintering at lower temperatures becomes possible. As a result, an optimum sintering temperature covers a wide range, and an oxygen content in the resultant sintered product can be favorably reduced.

The sintered product is then broken into pieces used to make an electrode or desired articles. Where an electrode is made, the pieces may be mixed with a small amount of a binder as is known in the art and shaped in a desired form. Alternatively, the alloy powder prior to the second thermal treatment is placed in a desired mold or the like, pressed, and finally subjected to the thermal treatment to obtain a shaped sintered body. This shaped body may be used as an electrode as it is.

If used, binders are not critical with respect to their type and include, for example, cellulose derivatives such as methyl cellulose, carboxylmethyl cellulose and the like, polyvinyl alcohol, polyethylene oxide, polytetrafluoroethylene, polymer latices, and the like. These may be used singly or in combination. The amount of the binder is in the range of 0.1 to 6 parts by weight per 100 parts by weight of a hydrogen storage alloy powder.

Where it is desirable to obtain a sintered alloy product, it is preferred to use, prior to the second thermal treatment, an alloy powder having an average size of 10 $\mu$m or below along with fine powder of Ni, Cu or the like and a binder such as PVC, methyl cellulose, carboxymethyl cellulose or the like. This is because the second thermal treatment can be conducted at lower temperature, ensuring improved moldability and dimensional stability of the sintered product.

The alloy powder or sintered product of the alloy, which has a defined range of the gradient of pf, is used as an electrode. A conductive support may be used for the electrode. The support may be any one ordinarily employed for a negative electrode of alkaline batteries and includes, for example, a conductive support having a three-dimensional structure such as fibrous nickel, foamed nickel and the like, a conductive support having a two-dimensional structure such as a punched metal, and the like. The alloy powder obtained after the second thermal treatment is packed to these supports and sintered to obtain a sintered product supported therewith.

As will be apparent from the above, the hydrogen storage alloy sintered product and its powder of the invention can be obtained by thermally treating or sintering a starting hydrogen storage alloy powder having a defined range of an average particle size in the second thermal treatment. To this end, the procedure of making the product or powder can be carried out without increasing of the number of steps at low costs. The resulting product or powder exhibits a good PCT characteristic and is unlikely to cause cracking when applied to as a negative electrode.

The invention is more particularly described by way of examples, which should not be construed as limiting the invention thereto.

Example 1

Ni, Co, Mn and Al were, respectively weighed at atomic ratios of 3.65, 0.75, 0.3 and 0.3 to 1.00 of Ln (consisting of 60 wt % of La, 10 wt % of Ce, 25 wt % of Pr, and 5 wt % of Nd), followed by melting in a high frequency melting furnace and cooled to obtain an alloy ingot. The thus obtained ingot was subjected to a first thermal treatment in an atmosphere of argon under conditions of 1050° C. and 10 hours, followed by wet grinding by use of an attritor, filtration, and drying in vacuum to obtain a hydrogen storage alloy powder having an average size of 5 $\mu$m and an oxygen concentration of 0.45 wt %. The thus obtained alloy powder was subjected to a second thermal treatment in an atmosphere of argon containing 100 ppm of oxygen under conditions of 900° C. and 3 hours to obtain a sintered product of the alloy.

The sintered product had an oxygen concentration of 0.6 wt %. The sintered product was ground to pieces, and the alloy powder was subjected to measurement of a PCT characteristic by use of Sivert's PCT characteristic measuring device (LESCA Model PCT-A043) wherein a hydrogen equilibrium pressure at 45° C. was measured, from which a gradient, pf, in the plateau region was calculated with the result that the gradient was 0.1.

Moreover, an amount of stored hydrogen of H/M at a hydrogen equilibrium pressure of 0.3 MPa was measured, revealing that the amount was found to be 0.72. The sintered product in powder form was observed through an electronic microscope (EMGA-650, commercially available from Horiba Co., Ltd.), from which any breakage or cracking of the alloy grains was found.

Example 2

The general procedure of Example 1 was repeated except that the second thermal treatment of the alloy powder was effected in an atmosphere of argon with a controlled oxygen concentration of 500 ppm under conditions of 600° C. and 5 hours.

The resultant alloy consisted of a semi-sintered product with its oxygen concentration of 0.7 wt %. The value of pf was found to be 0.35 and the value of H/M was found to be 0.67. Any breakage or cracking of the alloy grains was not found.

Example 3

The general procedure of Example 1 was repeated except that the second thermal treatment of the alloy powder was effected in an atmosphere of argon with a controlled oxygen concentration of 500 ppm under conditions of 900° C. and 5 hours.

The resultant sintered product had an oxygen concentration of 1.0 wt %. The value of pf was found to be 0.27 and the value of H/M was found to be 0.60. Any breakage or cracking of the alloy grains was not found.

Example 4

The general procedure of Example 1 was repeated except that the hydrogen storage alloy obtained after the first thermal treatment was ground to obtain a hydrogen storage alloy powder having an average size of 10 μm and an oxygen concentration of 0.3 wt %.

The resultant sintered product had an oxygen concentration of 0.4 wt %. The value of pf was found to be 0.30 and the value of H/M was found to be 0.60. Any breakage or cracking of the alloy grains was not found in the alloy product.

Example 5

The general procedure of Example 1 was repeated except that the hydrogen storage alloy obtained after the first thermal treatment was ground to obtain a hydrogen storage alloy powder having an average size of 15 μm and an oxygen concentration of 0.2 wt %.

The resultant sintered product had an oxygen concentration of 0.3 wt %. The value of pf was found to be 0.45 and the value of H/M was found to be 0.64. A slight degree of fresh cracking of the alloy grains was found in the alloy product.

Example 6

The general procedure of Example 1 was repeated except that the hydrogen storage alloy powder obtained after the first thermal treatment was further thermally treated under conditions of 300° C. and 10 hours, thereby obtaining a hydrogen storage alloy powder.

The thus obtained alloy powder had an oxygen concentration of 0.5 wt %. The value of pf was found to be 0.19 and the value of H/M was found to be 0.75. Any breakage or cracking of the alloy grains was not found in the alloy product.

Example 7

The general procedure of Example 1 was repeated except that the hydrogen storage alloy obtained after the first thermal treatment was ground to pieces having an average size of 10 μm and subjected to a second thermal treatment under conditions of 750° C. and 5 hours.

The resultant hydrogen storage alloy was in a semi-sintered state which had an oxygen concentration of 0.3 wt %, a value of pf of 0.15, and a value of H/M of 0.70. Any breakage or cracking of the alloy grains was not found in the alloy product.

Example 8

The general procedure of Example 7 was repeated except that the alloy powder obtained in Example 7 was subjected to a second thermal treatment under conditions of 450° C. and 10 hours.

The resultant alloy powder had an oxygen concentration of 0.4 wt %, a value of pf of 0.20, and a value of H/M of 0.62. Any breakage or cracking of the alloy grains was not found in the alloy product.

Comparative Example 1

The general procedure of Example 1 was repeated except that the hydrogen storage alloy obtained after the first thermal treatment was ground to pieces having an average size of 25 μm and an oxygen concentration of 0.1 wt %, followed by the second thermal treatment.

The resultant sintered product had an oxygen concentration of 0.2 wt %, a value of pf of 0.55, and a value of H/M of 0.67. The alloy grains were found to be cracked.

Comparative Example 2

The general procedure of Example 1 was repeated except that the hydrogen storage alloy powder obtained after the first thermal treatment was subjected to a second thermal treatment under conditions of 1100° C. and 2 hours.

The resultant sintered product had an oxygen concentration of 1.0 wt %, a value of pf of 0.62, and a value of H/M of 0.56. Any breakage or cracking was not found in the alloy grains.

Comparative Example 3

The general procedure of Example 1 was repeated except that the hydrogen storage alloy powder obtained after the first thermal treatment was subjected to a second thermal treatment in an atmosphere of argon containing 1000 ppm of oxygen.

The resultant sintered product had an oxygen concentration of 2.0 wt %, a value of pf of 0.62, and a value of H/M of 0.40. Any breakage or cracking was not found in the alloy grains.

Comparative Example 4

The general procedure of Example 1 was repeated except that the hydrogen storage alloy powder obtained after the first thermal treatment was subjected to a second thermal treatment under conditions of 150° C. and 15 hours.

The resultant alloy powder had an oxygen concentration of 0.5 wt %, a value of pf of 0.58, and a value of H/M of 0.55. Any breakage or cracking was not found in the alloy grains.

Comparative Example 5

The general procedure of Example 1 was repeated except that such a hydrogen storage alloy composition as used in Example 1 was used to obtain an alloy ingot as obtained in Example 1, followed by a first thermal treatment in an atmosphere of argon under conditions of 1050° C. and 10 hours, wet grinding by use of an attritor, and drying in air to obtain a hydrogen storage alloy powder having an average size of 10 μm and an oxygen concentration of 0.9 wt %, and that the alloy powder was subjected to a second thermal treatment in the same manner as in example 1.

The resultant sintered product had an oxygen concentration of 1.5 wt %, a value of pf of 0.60, and a value of H/M of 0.52. Any breakage or cracking was not found in the alloy grains.

Comparative Example 6

The general procedure of Example 1 was repeated without conducting any second thermal treatment. Since any second thermal treatment was not carried out, the resultant alloy product had an oxygen concentration of 0.45 wt %, a value of pf of 0.55, and a value of H/M of 0.48. Any breakage or cracking was not found in the alloy grains.

From the above results, it will be assumed that the second thermal treatment contributes to the reduction in amount of fine segregation in the fine regions of the alloy structure.

The thermal treating conditions and the results of the examples and the comparative examples are summarized in Table 1 below.

TABLE 1

| | Particle size prior to First thermal treatment (μm) | Oxygen concentration in alloy prior to second thermal treatment (wt %) | Temperature of second thermal treatment (°C.) | Second thermal treating time (hrs) | Oxygen concentration in an atmospherre in second thermal treatment (ppm) | Value of pf | Value of H/M | Oxygen concentration in final alloy (wt %) | Appearance | State of alloy after second thermal treatment |
|---|---|---|---|---|---|---|---|---|---|---|
| Example | | | | | | | | | | |
| 1 | 5 | 0.45 | 900 | 3 | 100 | 0.10 | 0.72 | 0.60 | not cracked | sintered |
| 2 | 5 | 0.45 | 600 | 5 | 500 | 0.35 | 0.67 | 0.70 | not cracked | semi-sintered |
| 3 | 5 | 0.45 | 900 | 5 | 500 | 0.27 | 0.60 | 1.00 | not cracked | sintered |
| 4 | 10 | 0.30 | 900 | 3 | 100 | 0.30 | 0.60 | 0.40 | not cracked | sintered |
| 5 | 15 | 0.20 | 900 | 3 | 100 | 0.45 | 0.64 | 0.30 | *slightly cracked | sintered |
| 6 | 5 | 0.45 | 300 | 10 | 100 | 0.19 | 0.75 | 0.50 | not cracked | powder |
| 7 | 10 | 0.30 | 750 | 5 | 100 | 0.15 | 0.70 | 0.40 | not cracked | semi-sintered |
| 8 | 10 | 0.30 | 450 | 10 | 100 | 0.20 | 0.62 | 0.40 | not cracked | powder |
| Comp. Ex. | | | | | | | | | | |
| 1 | 25 | 0.10 | 900 | 3 | 100 | 0.55 | 0.67 | 0.20 | **cracked | sintered |
| 2 | 5 | 0.45 | 1100 | 2 | 100 | 0.62 | 0.56 | 1.00 | not cracked | sintered |
| 3 | 5 | 0.45 | 900 | 3 | 1000 | 0.65 | 0.40 | 2.00 | not cracked | sintered |
| 4 | 5 | 0.45 | 150 | 15 | 100 | 0.58 | 0.55 | 0.50 | not cracked | powder |
| 5 | 10 | 0.90 | 900 | 3 | 100 | 0.60 | 0.52 | 1.50 | not cracked | sintered |
| 6 | 5 | 0.45 | — | — | — | 0.55 | 0.48 | 0.45 | not cracked | powder |

*The term "slightly cracked" means one or two crack in one particle or grain.
**The term "cracked" means "wholly cracked".

What is claimed is:

1. A method for making a hydrogen storage alloy which comprises subjecting a bulky hydrogen storage alloy to a first thermal treatment at a temperature ranging from 800° to 1100° C., cooling the thus treated alloy, grinding the cooled alloy to pieces having an average particle size of 20 μm or below, and subjecting the pieces to a second thermal treatment in vacuum or in an atmosphere of an inert gas at a temperature of 200° to 1050° C. to obtain an alloy product.

2. A method according to claim 1, wherein said pieces have an average size of 1 to 10 μm.

3. A method according to claim 1, wherein the second thermal treatment is carried out at a temperature ranging from 60° to 1000° C.

4. A method according to claim 1, wherein said pieces has an oxygen concentration of 0.8 wt % or below.

5. A method according to claim 4, wherein said pieces has an oxygen concentration of 0.5 wt % or below.

6. A method according to claim 4, wherein the atmosphere contains 900 ppm or below of oxygen.

7. A method according to claim 1, wherein said atmosphere contains 900 ppm or below of oxygen.

8. A method according to claim 7, wherein said atmosphere contains 500 ppm or below of oxygen.

9. A hydrogen storage alloy obtained by the method defined in claim 1, wherein when the alloy is subjected to measurement of a PCT characteristic, a gradient, pf, in a plateau region of a PCT characteristic curve is in the range of 0.5 or below wherein pf=ln(PH/M=0.5/PHI/M=0.2) in which PH/M=0.5 is an equilibrium pressure of hydrogen (MPa) at H/M=0.5 and PH/M=0.2 is an equilibrium pressure of hydrogen (MPa) at H/M=0.2.

10. A hydrogen storage alloy according to claim 9, wherein said alloy has a composition of the general formula, $Ln(Ni_aMn_bAl_cCo_d)_x$, in which Ln is a mixture of rare earth elements containing at least La, $3.0 \leq a \leq 4.5$, $0 \leq b \leq 0.6$, $0 \leq c \leq 0.4$, $0 \leq d \leq 1.0$, and $4.0 \leq x \leq 6.0$.

11. A hydrogen storage alloy according to claim 10, wherein a content of La in Ln is 20 wt % or above.

12. A hydrogen storage alloy according to claim 9, wherein said hydrogen storage alloy consists of a sintered alloy.

* * * * *